(No Model.)
R. H. LAPAGE.
MEANS FOR EFFECTING LOCOMOTION ON STEEP INCLINES.
No. 360,230. Patented Mar. 29, 1887.
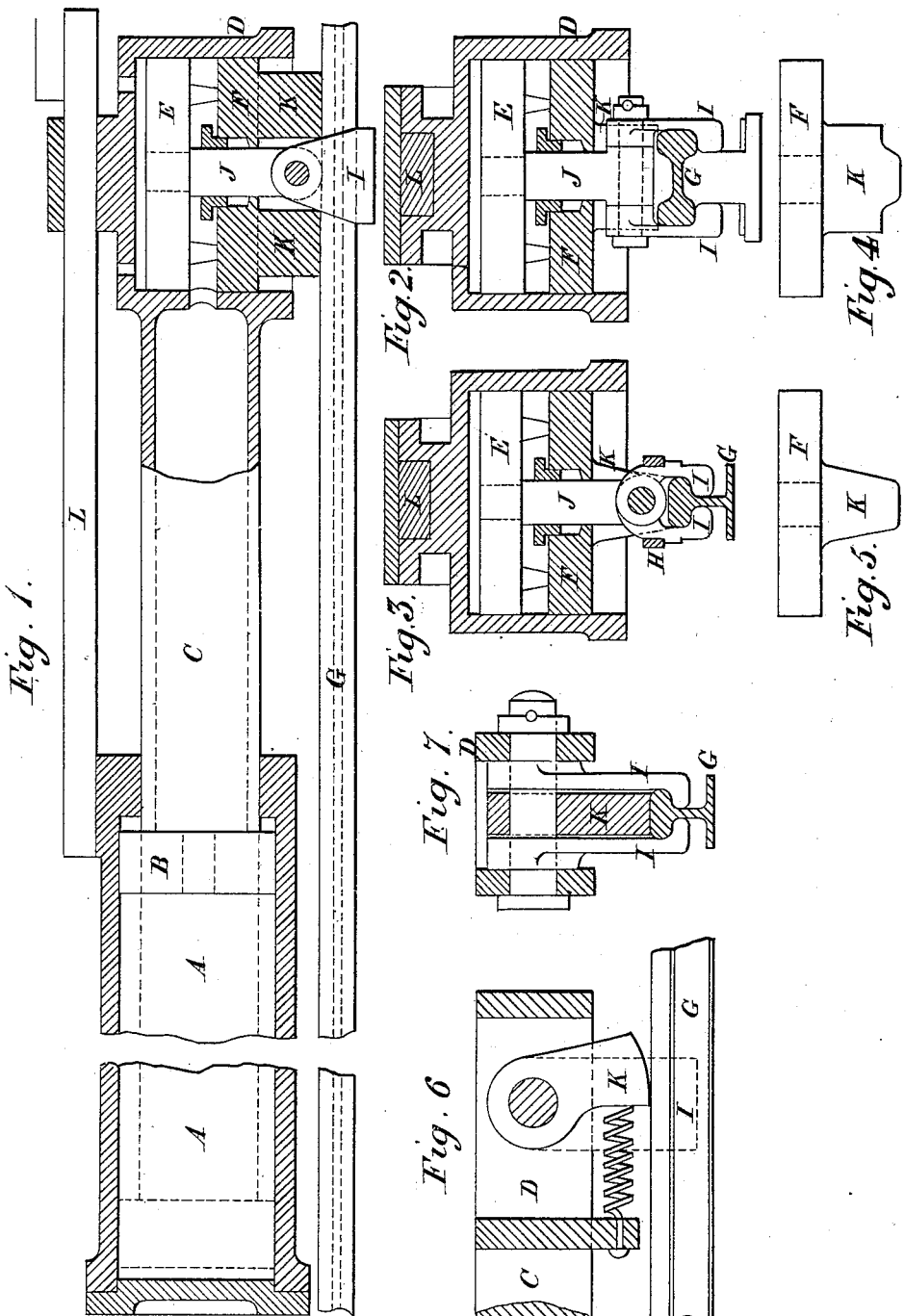
Witnesses,
J. A. Rutherford
Robert Everett
Inventor
Richard H. Lapage
By James L. Norris, Atty.

(No Model.) 2 Sheets—Sheet 2.
R. H. LAPAGE.
MEANS FOR EFFECTING LOCOMOTION ON STEEP INCLINES.
No. 360,230. Patented Mar. 29, 1887.
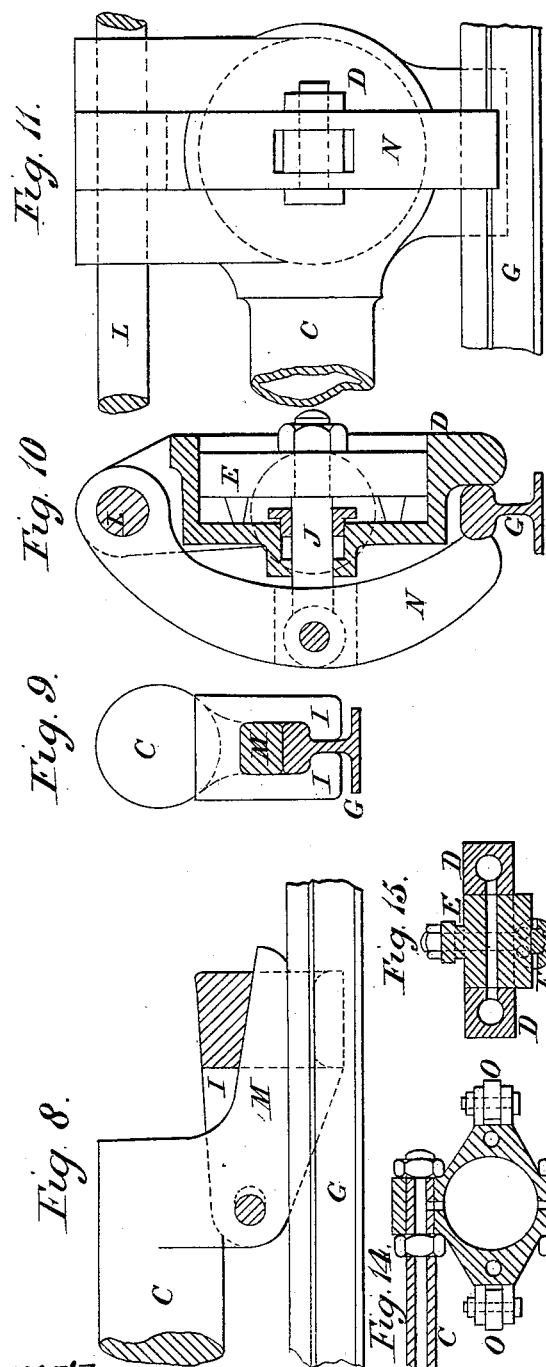

UNITED STATES PATENT OFFICE.

RICHARD HERBERT LAPAGE, OF BANK CHAMBERS, NEW OXFORD STREET, COUNTY OF MIDDLESEX, ENGLAND.

MEANS FOR EFFECTING LOCOMOTION ON STEEP INCLINES.

SPECIFICATION forming part of Letters Patent No. 360,230, dated March 29, 1887.

Application filed December 2, 1886. Serial No. 220,512. (No model.) Patented in England February 15, 1886, No. 2,208, and in Belgium November 28, 1886, No. 75,346.

*To all whom it may concern:*

Be it known that I, RICHARD HERBERT LAPAGE, a citizen of England, residing at Bank Chambers, New Oxford Street, in the county of Middlesex, England, have invented a new and useful Means for Effecting Locomotion on Steep Inclines, (for which I have obtained patent in Great Britain by Patent No. 2,208, dated February 15, 1886, and Belgium, No. 75,346, dated November 28, 1886,) of which the following is a specification.

My invention relates to means for causing a vehicle or a train of vehicles to ascend steep inclines. For this purpose I fix on the vehicle or on several vehicles several cylinders having their axes parallel to the rails, each cylinder being fitted with a piston and piston-rod. At the end of the piston-rod is a clamp, which may be of the kind used as a pawl in silent feed-gear, or may consist of parts pressed together by fluid-pressure.

When the piston is at the end of its stroke toward the front, the clamp is made to take firm hold of a rail or stationary rope or chain, and then, the piston being subjected to pressure, the cylinder and vehicle are pushed forward until the piston is at the rear end of the cylinder. At this time the clamp is released and the piston and clamp are caused, by pressure acting at the rear end of the cylinder, to advance until the stroke is completed, whereupon the clamp is again made to take hold. Thus step by step, by alternately clamping, pushing forward, unclamping, and drawing back the clamp, the vehicle or train of vehicles is propelled up the incline. I prefer to arrange the valves for admitting the pressure to the several cylinders to act in rotation, so that while the clamp of one is being withdrawn that of another of them is keeping hold and acting for propulsion. The cylinders may be supplied with steam or with other fluid or water under pressure. When the clamp is operated by pressure, I make it in two parts, each connected to a piston in a cylinder, or the one connected to the piston and the other to the cylinder. I admit the fluid under pressure to act between the two pistons or between the piston and the cylinder end, thus moving the two parts of the clamp so as to grip between them the rail or the stationary rope or chain. On relieving the pressure the clamp is released, and counter-weights or springs, or pressure acting in the opposite direction, may be used to assist the release. When a clamp of this kind is employed, the cylinder in which the pressure acts on the clamp is preferably connected with the propelling-cylinder, so that the clamping and unclamping take place simultaneously with the alternation of pressure on the propelling-piston. These or similar auxiliary clamps acted on by fluid-pressure may be employed as brakes in descending the incline, the pressure being regulated to give such friction as may be required.

Figure 1 of the accompanying drawings is a longitudinal section of a propelling-cylinder and clamp according to my invention. Fig. 2 is a transverse section of the clamping apparatus. Fig. 3 is a transverse section of a modified form thereof; Figs. 4 and 5, detail views of the blocks on the lower piston of the clamping devices. Figs. 6 and 7 are respectively a part longitudinal section and a transverse section of the head of the piston-trunk, showing another modification of the clamping devices; Figs. 8 and 9, similar views showing still another modification of the clamping devices. Figs. 10 and 11 are respectively a transverse section and side elevation of a modification, showing still another modification of the clamping devices. Figs. 12 and 13 are respectively a longitudinal sectional view, partly in section, and a transverse section through the cylinders; and Figs. 14 and 15 are respectively a sectional plan and transverse section of the clamping-cylinder.

The cylinder A, which may be a hydraulic cylinder, as shown, is fitted with a piston, B, having a tubular trunk-stem, C, which has at its end the clamping-cylinder D. The annular space around the trunk C may be always in communication with the water or liquid under pressure, which is alternately supplied to and discharged from the cylinder A by the action of any known slide or other valve, so that the piston B, and with it the clamp-cylinder D, is caused to reciprocate, D being guided along a bar or guide L.

Within the cylinder D are two pistons, E and F, the space between which communicates through the tubular rod C with the cylinder A, so that when fluid under pressure acts in A, pressing the piston B toward the right, the pressure acts also in D, forcing the piston E upward and F downward. The piston E is connected by a rod, J, with hook-jaws I, which catch under a rail, G, and the piston F has projecting from it blocks K, as shown separately in Figs. 4 and 5, which bear on the upper side of the rail G. The rail being thus clamped between I and K while the pressure is acting in A, tending to propel B to the right, the head D and piston B are kept stationary, and consequently the cylinder A and the vehicle to which it is attached are propelled toward the left. When the pressing-fluid is discharged from A, the clamps I and K are released, and the piston B makes its back-stroke, subject to the pressure on its annular area.

The slight back-stroke of the pistons E and F to slacken the clamp may be effected by springs drawing them together, or they might be arranged as trunk-pistons with fluid-pressure constantly acting on their annular areas so as to force them together when the pressure forcing them apart is relieved. When the clamp is arranged as in Fig. 3, a ring, H, prevents the jaws I from spreading apart. This ring can be raised and the jaws I can be folded up when the clamping action is not required.

Fig. 6 is a part longitudinal section, and Fig. 7 is a transverse section, of the head D of the piston-trunk C, provided with a clamp operating in the manner of a silent feed, clamping the rail G between the hook-jaws I I, and the cam-pawl K, which is strained by a spring tending to engage it when D moves to the right.

Figs. 8 and 9 show a modified arrangement of clamp operating as silent feed. In this case the hook-jaws I, jointed by slotted holes to the piston-rod C, which terminates in a wedge-piece, M, that in moving toward the right advances under the head of the jaws I and strains their hooks tightly up against the head of the rail G during the forward stroke, releasing them during the back-stroke.

In Figs. 10 and 11 are shown in transverse section and in side view an arrangement of clamp acted on by the fluid-pressure to grip the rail G at the sides of its head. In this case the piston E, when subjected to the pressure, draws the jaw N toward D, and thus the rail G is firmly held until the pressure is relieved. The guide L is round, so as to allow the cylinder D to accommodate itself laterally to the rail.

Figs. 12 to 15, inclusive, show an arrangement of two propelling-cylinders acting in combination with one clamp, Fig. 12 being a longitudinal section, partly in elevation; Fig. 13, a transverse section through the cylinders; Figs. 14 and 15, respectively, a sectional plan and a transverse section of the clamping-cylinder.

A A are the two cylinders, each having a piston, B, to which is spherically jointed a tubular rod, C, within a trunk. The two rods C are connected to and communicate with the clamping-cylinder D, which has rollers O, running on the rail G. In the cylinder D are fitted the two pistons, E and F, which, when forced apart by the fluid-pressure, cause the rail-head to be firmly clamped.

Heretofore an electro-magnetic railway-engine has comprised a crank-shaft revolved by connection with the electromotor, two reciprocating arms attached to said shaft at opposite points, so as to work oppositely, and grippers carried by the reciprocating arms and acting upon the rails of the road. Such, however, is not my invention, and is not claimed by me.

Having thus described the nature of my invention and in what manner the same may be carried into practical effect, I claim—

1. The combination, with a stationary rail or its equivalent, of a clamp for gripping and releasing the rail, a horizontal cylinder, A, a piston, B, in said cylinder subject to fluid-pressure, and the trunk C, connecting with the piston and with the clamp for moving the latter to and fro, substantially as described.

2. The combination, with the clamp-cylinder D, a clamp, and devices for supporting the clamp in the clamp-cylinder, of a cylinder, A, a piston, B, therein subject to fluid-pressure, and a trunk, C, connecting the piston with the clamp-cylinder, substantially as and for the purpose described.

3. The combination, with a stationary rail or its equivalent, of a clamp for gripping the rail, a piston connected with the clamp, and a piston subject to fluid-pressure that at the same time acts on the piston to which the clamp is connected for moving the clamp to and fro and causing it to intermittently grip and release the rail, substantially as described.

In testimony whereof I have signed my name to this specification, in the presence of two subscribing witnesses, this 13th day of November, A. D. 1886.

R. HERBERT LAPAGE.

Witnesses:
OLIVER IMRAY,
*Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*